May 23, 1939.  K. D. ANDREWS  2,159,243

SWITCH MECHANISM

Original Filed April 2, 1936

INVENTOR.
KINLOCH D. ANDREWS
BY
*Kwis, Hudson & Kent*
ATTORNEYS.

Patented May 23, 1939

2,159,243

UNITED STATES PATENT OFFICE 2,159,243

SWITCH MECHANISM

Kinloch D. Andrews, New York, N. Y., assignor to Gogan Machine Corporation, Cleveland, Ohio, a corporation of Ohio Original application April 2, 1936, Serial No. 72,377. Divided and this application August 7, 1936, Serial No. 94,761

7 Claims. (Cl. 200—56)

My invention relates to an indicating device, such as a gauge or the like, and to a novel form of electric switch incorporated therein.

This application is a division of my earlier application Serial No. 72,377, filed April 2, 1936.

An object of the present invention is to provide a novel form of electric switch adapted to be readily incorporated in an indicating or measuring device.

Another object of the invention is to provide a novel form of electric switch having an arrangement of contacts which includes a pair of arcuately movable arms and a spiral spring resisting movement of one contact arm when engaged by the other contact arm.

A further object of my invention is to provide a novel electric switch which is very sensitive and accurate and adapted to be incorporated in a gauge or indicator so that the switch contacts are operated by the same movement which causes actuation of the gauge pointer and without obstruction or hindrance to movement of the pointer.

Other objects and advantages of the invention will be apparent from the following description, when taken in conjunction with the accompanying sheet of drawing, wherein.

More detailed reference will presently be made to the accompanying drawing which illustrates one form of my novel electric switch, but before proceeding with a detailed description of this embodiment, it should be understood that the invention may be embodied in various devices and arrangements other than the particular device illustrated in this instance.

Figure 2:
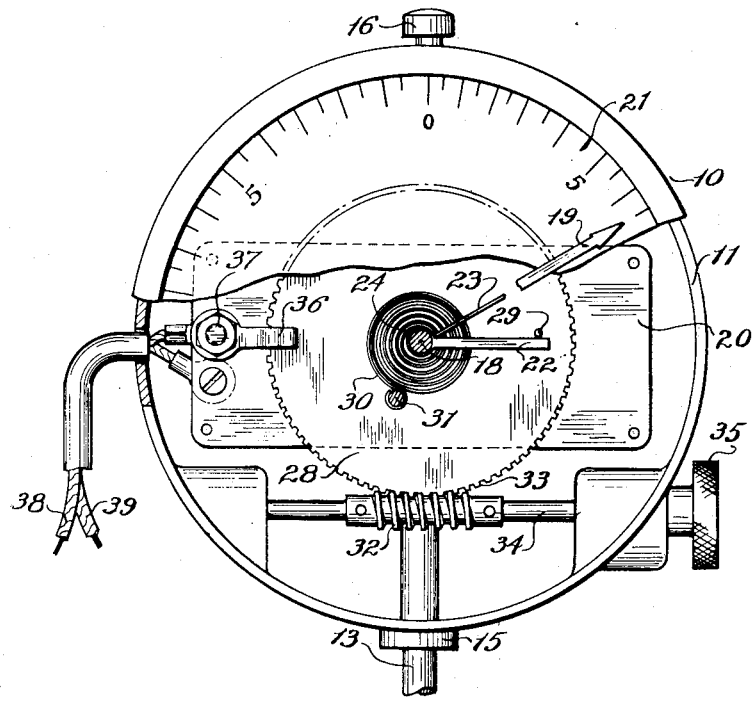
Fig. 2 is another front elevation of the gauge on a larger scale and with parts broken away to show the switch mechanism embodied therein.
Figure 1:
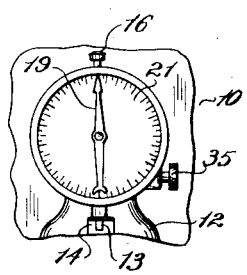
Fig. 1 is a front elevation showing a gauge or indicator having my novel switch device incorporated therein.
Figure 3:
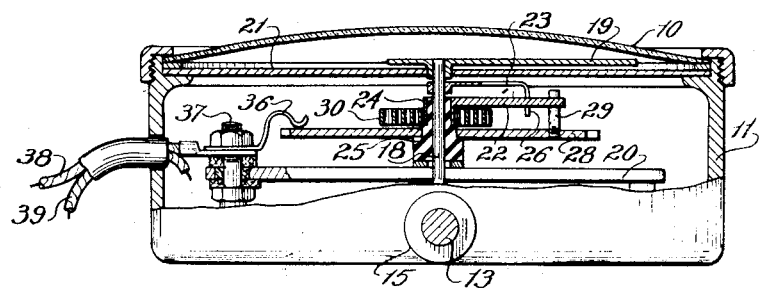
Fig. 3 is a side view of the gauge with parts thereof in section to further illustrate the switch mechanism.

As mentioned above, my novel electric switch may be embodied in a gauge or indicator, and in Figs. 2 and 3 of the drawing I have shown a depth gauge 10 having my novel switch incorporated therein. The depth gauge illustrated in this instance may be a gauge suitable for use on a testing machine, such as a hardness testing machine, for measuring the penetration or destortion of a specimen being tested. Gauges of this general type must be very accurate and sensitive because they are often required to indicate measurements on the order of some thousandths or millionths of an inch.

The gauge illustrated in this instance is provided with a casing 11 which provides a container or housing for the gauge and switch mechanisms. The gauge may be mounted by connecting the casing 11 with a suitable support 12 and may have an actuating stem 13 projecting therefrom for connection with an available movement transmitting member or actuating part 14. The actuating stem 13 may project from the casing 11 at one point through a guide stem 15 and at a substantially diametrally opposite point may extend from the casing as a knob 16.

The gauge here shown is of the type having a rotatable spindle 18 which carries a pointer 19 and to which movement is transmitted from the actuating stem 13. As is usual in gauges of this type, movement multiplying means in the form of a suitable gear train (not shown) may be provided in a gear carrier 20 for operably connecting the stem 13 with the spindle. The movement multiplying means may also include the usual spring which acts to normally return the pointer to an initial position. Such initial position of the pointer may be the zero indicator of a dial 21 across which the pointer is movable.

My novel electric switch which, as mentioned above is incorporated in the gauge 10, is preferably disposed between the gear carrier 20 and the dial 21. This switch may have cooperating contacts 22 and 23 in the form of arms rotatable about the axis of the spindle 18 and extending substantially radially therefrom. The contact arm 22 may have a hub portion 24 journaled on an insulating bushing 25 which surrounds the spindle. The contact arm 23 may be pinned or otherwise secured to the spindle 18 for movement therewith and may have a depending portion 26 which engages and, so to speak, picks up the contact arm 22 upon predetermined rotary movement of the gauge spindle.

This novel switch may also include a disk-like gear member 28 which is mounted upon the insulating bushing 25 and which constitutes a support for a stop in the form of a projecting pin 29. The contact 22 is normally urged toward engagement with the stop by a spiral spring 30. This spring is disposed around the spindle 18 and may have its outer end anchored to the gear member 28 by means of a pin 31. The inner end of the spiral spring acts upon the contact 22 and is preferably connected with the hub part 24 thereof.

To provide for adjustment of the switch with respect to the dial 21 of the gauge I employ a worm 32 which cooperates with teeth 33 formed on the periphery of the member 28. The worm is preferably formed of insulating material and may be pinned or otherwise secured to an operating shaft 34. This shaft may be journaled in the casing of the gauge and may have a knurled operating knob 35 thereon which is accessible from the exterior of the casing. By rotation of the knob the member 28 may be rotated in one direction or the other and the position of the contact arm 22 and its stop 29 thus accurately shifted with respect to the graduations of the dial 21.

Electrical connection with the contact arm 22 is made through the stop 29 or the spiral spring 30, the member 28 and a brush 36 which bears against the gear member. The brush may be supported by a terminal screw 37 which is insulated from the gear carrier 20 and with which a conductor 38 is connected. Electrical connection to the contact arm 23 may be made through the spindle 18 and other metallic parts of the gauge mechanism to the conductor 39 which is grounded on the gauge.

During use of the gauge and my novel switch device incorporated therein movement is imparted to the gauge stem 13. This movement, which may be on the order of some thousandths or millionths of an inch, is transmitted through the gear train of a gauge to cause a substantial rotary movement of the spindle 18 and an arcuate movement of the pointer 19 over the graduated dial 21. This rotary movement of the spindle causes corresponding arcuate movement of the contact arm 23, whereby the arm projection 26 is brought into engagement with the contact arm 22. By this engagement of the contacts of the switch a circuit is closed which may initiate the operation of a signal device, or may perform some other useful function. Since the contact arm 22 is held against the stop 29 only by the spiral spring 30 it will be picked up and carried along in arcuate movement by the contact arm 23 without arresting or in any way interfering with the movement of the gauge pointer 19.

Upon release of the gauge actuating stem 13 the spring contained in the gauge mechanism will cause movement of the stem in the opposite direction and the return of the pointer 19 to its initial or zero position. The rotary movement of the spindle which returns the pointer to its zero position also causes arcuate movement of the contact arm 23 in a direction to permit the contact arm 22 to be moved toward the stop 29 by the spiral spring 30. When the contact arm 22 engages the stop, its movement is arrested but the contact arm 23 continues to move with the spindle 18, thereby causing the contact portion 26 to be disengaged from the contact arm 22.

From the foregoing description and the accompanying drawing it will now be readily seen that I have provided a novel form of electric switch which is of simple construction, yet very accurate and reliable in operation. This novel switch is readily adapted to be incorporated in a gauge or other delicate and sensitive instrument, and when so incorporated functions efficiently and without hindering or in any way interfering with the usual functioning of the instrument. It will be understood further that my novel switch device includes a contact arm which is normally held against a stop by a spiral spring disposed about an actuating spindle and that such contact arm is adapted to be picked up and carried along by another contact arm actuated by the spindle.

While I have illustrated and described my novel switch device in a somewhat detailed manner it will be understood, of course, that I do not wish to be limited to the precise details of construction and manner of operation herein disclosed, but regard my invention as including such changes and modifications as do not constitute a departure from the spirit of the invention and the scope of the appended claims.

Having thus described my invention what I claim is:

1. A device of the character described comprising a rotatable spindle, a contact arm arcuately movable by the spindle, a second contact arm pivotally mounted for arcuate movement about the axis of the spindle and adapted to be engaged and moved by the first contact arm, one of said contact arms being insulated from the spindle, and a spiral spring disposed around the spindle and acting on the second contact arm to resist movement thereof.

2. A device of the character described comprising a rotatable spindle, a contact arm arcuately movable by the spindle, a second contact arm pivotally mounted for arcuate movement about the axis of the spindle and adapted to be engaged and moved by the first contact arm, one of said contact arms being insulated from the spindle, a spiral spring disposed around the spindle and acting on the second contact arm to resist movement thereof, and a stop against which the second contact arm is normally held by said spiral spring.

3. An electric switch comprising a rotary spindle, a pair of contact arms movable about the axis of the spindle, one being carried by the spindle and movable thereby into engagement with the other, a stop, and a spiral spring disposed around the spindle, said spring normally urging such other arm toward said stop but permitting movement of said other arm away from the stop by said one arm.

4. An electric switch comprising a casing, a rotary spindle therein, a support insulated from the spindle, means for adjusting said support, a stop on said support, a contact arm rotatable about said spindle but insulated therefrom, a spiral spring disposed around the spindle, said spring normally holding said contact arm against said stop, and a contact arm carried by said spindle and adapted to be moved thereby to pick up the first mentioned contact arm.

5. A device of the character described comprising a rotary spindle, a support disposed around but insulated from the spindle, means for rotatively adjusting said support, a contact arm carried by the spindle and arcuately movable thereby, a second contact arm pivotally mounted for arcuate movement about the spindle and adapted to be engaged and moved by the first mentioned contact arm, one of said contact arms being insulated from said spindle, a stop carried by said support, and a spiral spring normally holding the second contact arm against said stop.

6. In a device of the character described the combination of a rotary spindle, a bushing formed of insulating material disposed around the spindle and having a shoulder and an extension portion, a member supported by the bushing shoulder and having an opening through which the extension portion projects, a stop carried by said member, a contact arm pivotally mounted for swinging movement about the extension portion of the bushing, a spiral spring providing an electrical connection between said member and said contact arm and normally holding the latter against said stop, and a second contact arm carried by the spindle and adapted to be moved thereby to pick up the first mentioned contact arm.

7. In a device of the character described the combination of a rotary spindle, a bushing formed of insulating material disposed around the spindle and having a shoulder and an extension portion, a member supported by the bushing shoulder and having an opening through which the extension portion projects, a stop carried by said member, a contact arm mounted for swinging movement about the extension portion of the bushing, a spiral spring providing an electrical connection between said member and said contact arm and normally holding the latter against said stop, and a second contact arm carried by the spindle and adapted to be moved thereby to pick up the first mentioned contact arm, said member being arcuately movable about the bushing for adjusting the position of the stop.

KINLOCH D. ANDREWS.